(12) United States Patent
Kelley et al.

(10) Patent No.: US 7,940,679 B2
(45) Date of Patent: May 10, 2011

(54) POWER OUTAGE MANAGEMENT AND POWER SUPPORT RESTORATION FOR DEVICES IN A WIRELESS NETWORK

(75) Inventors: Raymond H. Kelley, Raleigh, NC (US); Kenneth C. Shuey, Zebulon, NC (US)

(73) Assignee: Elster Electricity, LLC, Raleigh, NC (US)

( * ) Notice: Subject to any disclaimer, the term of this patent is extended or adjusted under 35 U.S.C. 154(b) by 307 days.

(21) Appl. No.: 12/117,150

(22) Filed: May 8, 2008

(65) Prior Publication Data

US 2009/0278708 A1 Nov. 12, 2009

(51) Int. Cl.
*H04L 12/26* (2006.01)
(52) U.S. Cl. ... 370/242; 370/225; 370/328; 340/870.02; 340/870.39; 702/57
(58) Field of Classification Search .................. None
See application file for complete search history.

(56) References Cited

U.S. PATENT DOCUMENTS

| | | | |
|---|---|---|---|
| 7,053,770 B2 | 5/2006 | Ratiu et al. | |
| 7,251,570 B2 | 7/2007 | Hancock et al. | |
| 2006/0217936 A1* | 9/2006 | Mason et al. | 702/188 |
| 2006/0241880 A1 | 10/2006 | Forth et al. | |
| 2007/0120705 A1 | 5/2007 | Kiiskila et al. | |
| 2007/0206521 A1 | 9/2007 | Osaje | |
| 2008/0189436 A1* | 8/2008 | Vaswani et al. | 709/242 |
| 2009/0034419 A1* | 2/2009 | Flammer et al. | 370/238 |

FOREIGN PATENT DOCUMENTS

| | | |
|---|---|---|
| JP | 2004194040 A | 7/2004 |
| JP | 2006352660 A | 12/2006 |
| KR | 20000015296 A | 3/2000 |
| WO | 0189229 A2 | 11/2001 |

OTHER PUBLICATIONS

Examination Report, New Zealand Patent No. 576816, mailed May 15, 2009.

* cited by examiner

*Primary Examiner* — Ayaz R Sheikh
*Assistant Examiner* — Nicholas Sloms
(74) *Attorney, Agent, or Firm* — Woodcock Washburn LLP

(57) ABSTRACT

Techniques for power outage management and power support restoration for devices in a wireless network are disclosed herein. Such a wireless network may include a number of bi-directional nodes in bi-directional wireless communication with one or more central nodes. Each bi-directional node may have a wireless communication path to one of the central nodes that is either a direct path or an indirect path through one or more intermediate bi-directional nodes serving as relays. Each bi-directional node may be configured to detect when it has become stranded such that it can no longer communicate with its assigned central node via its assigned communication path, to determine a reason for its stranding, and to transmit a stranding notification and the reason therefore.

18 Claims, 10 Drawing Sheets

POWER OUTAGE MANAGEMENT AND POWER SUPPORT RESTORATION FOR DEVICES IN A WIRELESS NETWORK

BACKGROUND OF THE INVENTION

Automated systems exist for controlling and measuring usage of resources, such as gas, water and electricity. Such systems may include a number of different types of devices, which will collectively be referred to herein as "system devices." Such system devices may include, for example, meter devices (e.g., gas, water, electricity meters, etc.), premises devices (e.g., in-home displays, thermostats, load control devices, etc.), and various other devices (e.g., communications devices, etc.). Within these automated systems, a number of different infrastructures may be employed for communicating data to and from the system devices. For example, some automated systems communicate with the system devices using a fixed wireless network, that includes, for example, a control node (e.g., central node) in communication with a number of device nodes (i.e., system devices). At the device nodes, the wireless communications circuitry may be incorporated into the system devices themselves, such that each device node in the wireless network comprises a system device having wireless communication circuitry that enables the system device to communicate with the control node. The device nodes may either communicate directly with an assigned control node, or indirectly though one or more assigned intermediate device nodes serving as repeaters. Some networks operating in this manner are referred to as "mesh" networks.

In many fixed wireless networks, system devices will be powered by an electrical distribution network such as depicted in FIG. 1. This is cost effective but creates a dependency between power and the ability of the system devices to communicate with one another. This dependency creates challenges for using wireless devices to provide notification of power outage conditions that occur on the electrical distribution network. Communication between wireless devices is often uncorrelated with the electrical distribution network, but the power needed to communicate is sourced from the electrical distribution network. In FIG. 1, the bold lines stemming from substation 500 represent electrical distribution lines providing power to central nodes 510 and 520 and bi-directional device nodes 10-22, while the dashed lines represent assigned bi-directional wireless communication paths between the nodes.

In a system such as shown in FIG. 1, faults and other problems on the electrical distribution network may present a number of challenges. For example, when a fault condition occurs, it is often difficult to determine the extent of the power outage resulting from the fault and to develop a power restoration scheme. Another problem is that a fault condition may result in a number of network nodes being "stranded," meaning that the nodes remain powered after the fault but are unable to communicate with their assigned central node via their assigned communication path. For example, as shown in FIG. 2, a fault 530 has occurred between nodes 12 and 13, resulting in a loss of power at node 13. Unlike node 13, nodes 14-17 remain powered after the fault condition because they are on different power distribution lines than node 13. However, nodes 14-17 communicate with their assigned central node 510 via an assigned communication path through node 13. Thus, fault 530 results in the stranding of nodes 14-17. It should be noted here that, in addition to device nodes, a fault may result in a loss of power at one or more central nodes. Such a loss of power at a central node may result in the stranding of each of the central node's assigned device nodes that remain powered after the fault. It should also be noted here that, in addition to faults, nodes may become stranded due to other electrical distribution problems or to problems occurring during the restoration process itself.

Thus, there is a need in the art for power outage management and power support restoration techniques for devices in a wireless network.

SUMMARY OF THE INVENTION

Techniques for power outage management and power support restoration for devices in a wireless network are disclosed herein. Such a wireless network may include a number of bi-directional nodes in bi-directional wireless communication with one or more central nodes. Each bi-directional node may have a wireless communication path to one of the central nodes that is either a direct path or an indirect path through one or more intermediate bi-directional nodes serving as relays. Each bi-directional node may be configured to detect when it has become stranded such that it can no longer communicate with its assigned central node via its assigned communication path, to determine a reason for its stranding, and to transmit a stranding notification and the reason therefore.

In an embodiment, a bi-directional node may classify itself as stranded due to any one of three reasons. The bi-directional node may classify itself as stranded when it receives a power outage notification (e.g., "last gasp" notification) from an upstream node in its assigned communication path. The bi-directional node may also classify itself as stranded when it fails to receive any communication for greater than a threshold time period after power restoration. The bi-directional node may also classify itself as stranded when it fails to receive any communication from a central node for greater than a threshold time period.

To detect when bi-directional nodes have become stranded, a central node may transmit a broadcast stranding request. Upon receiving the broadcast stranding request, each of the bi-directional nodes may either, if stranded, respond to the request with a stranding notification and the reason therefore, or, if not stranded, re-broadcast the request to other bi-directional nodes. Alternatively, a central node may transmit a targeted stranding request to one or more suspected stranded bi-directional nodes.

When a stranded bi-directional node is identified as such, a new communication path for the stranded node to its previous central node or to a different central node may be determined. An identification of the new communication path may then be transmitted to the stranded bi-directional node via the new communication path. A plan for restoration of power may also be determined based on the notifications received from the stranded meters.

Other features and advantages of the invention may become apparent from the following detailed description of the invention and accompanying drawings.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods and instrumentalities disclosed. In the drawings.

DETAILED DESCRIPTION OF ILLUSTRATIVE EMBODIMENTS

Exemplary systems and methods for gathering meter data are described below with reference to FIGS. 1-9. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water, and gas, are operable to wirelessly communicate. One or more devices, referred to herein as "collectors," are provided that "collect" data transmitted by the other meter devices so that it can be accessed by other computer systems. The collectors receive and compile metering data from a plurality of meter devices via wireless communications. A data collection server may communicate with the collectors to retrieve the compiled meter data.

Figure 1:
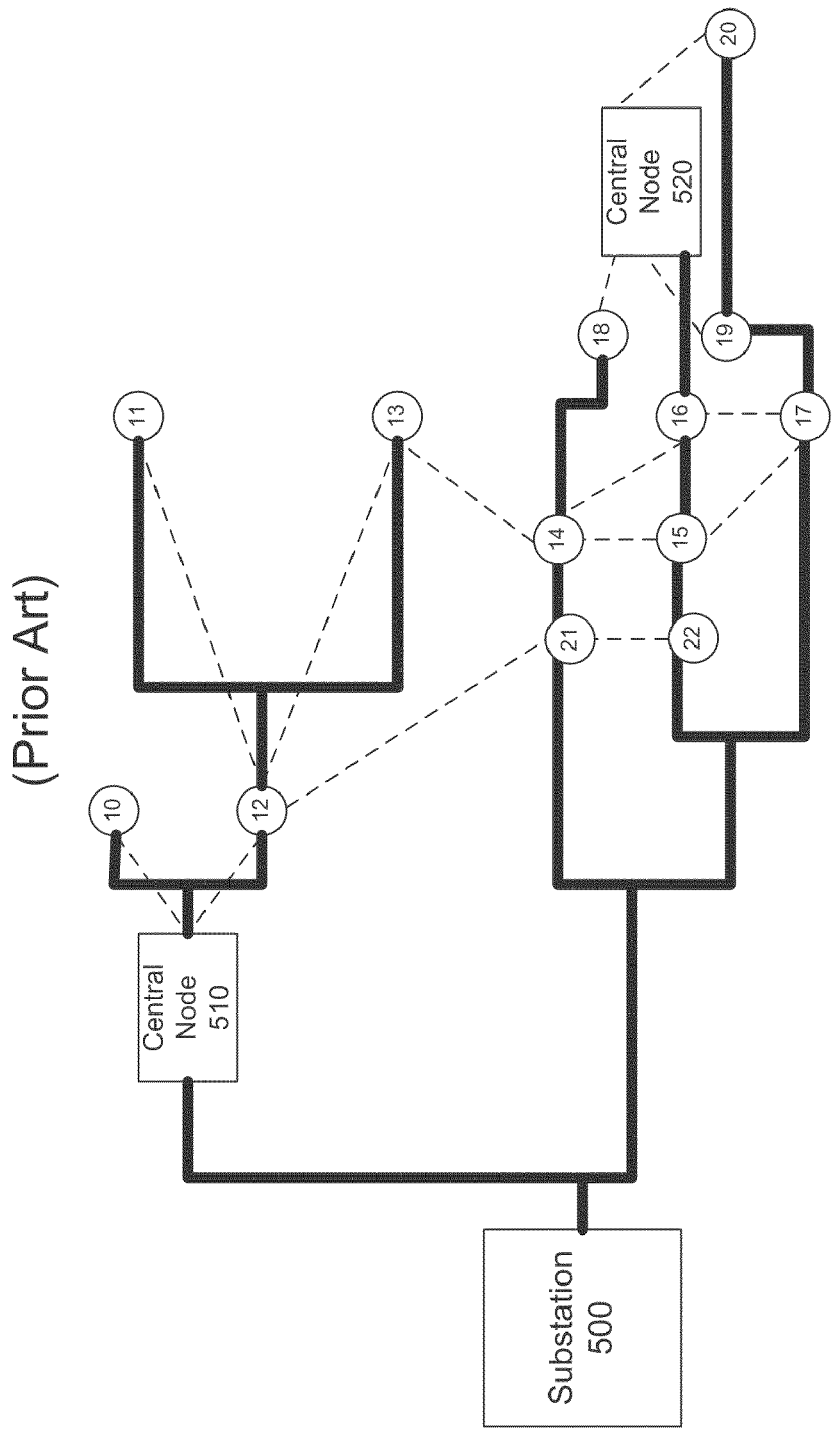
FIG. 1 is a diagram of an exemplary wireless network and electrical distribution system.
Figure 2:
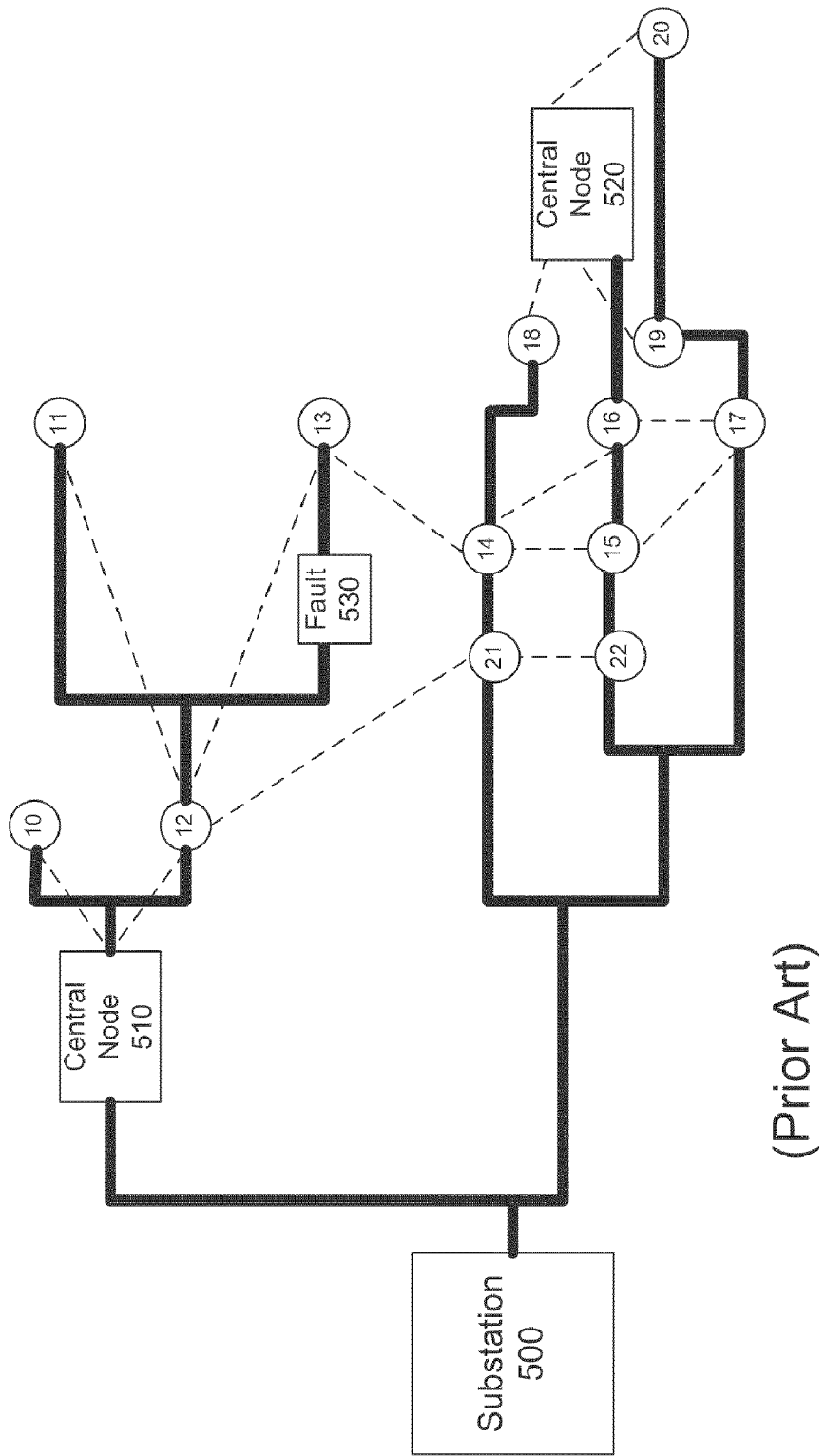
FIG. 2 is a diagram of an exemplary wireless network and electrical distribution system with a fault condition.
Figure 3:
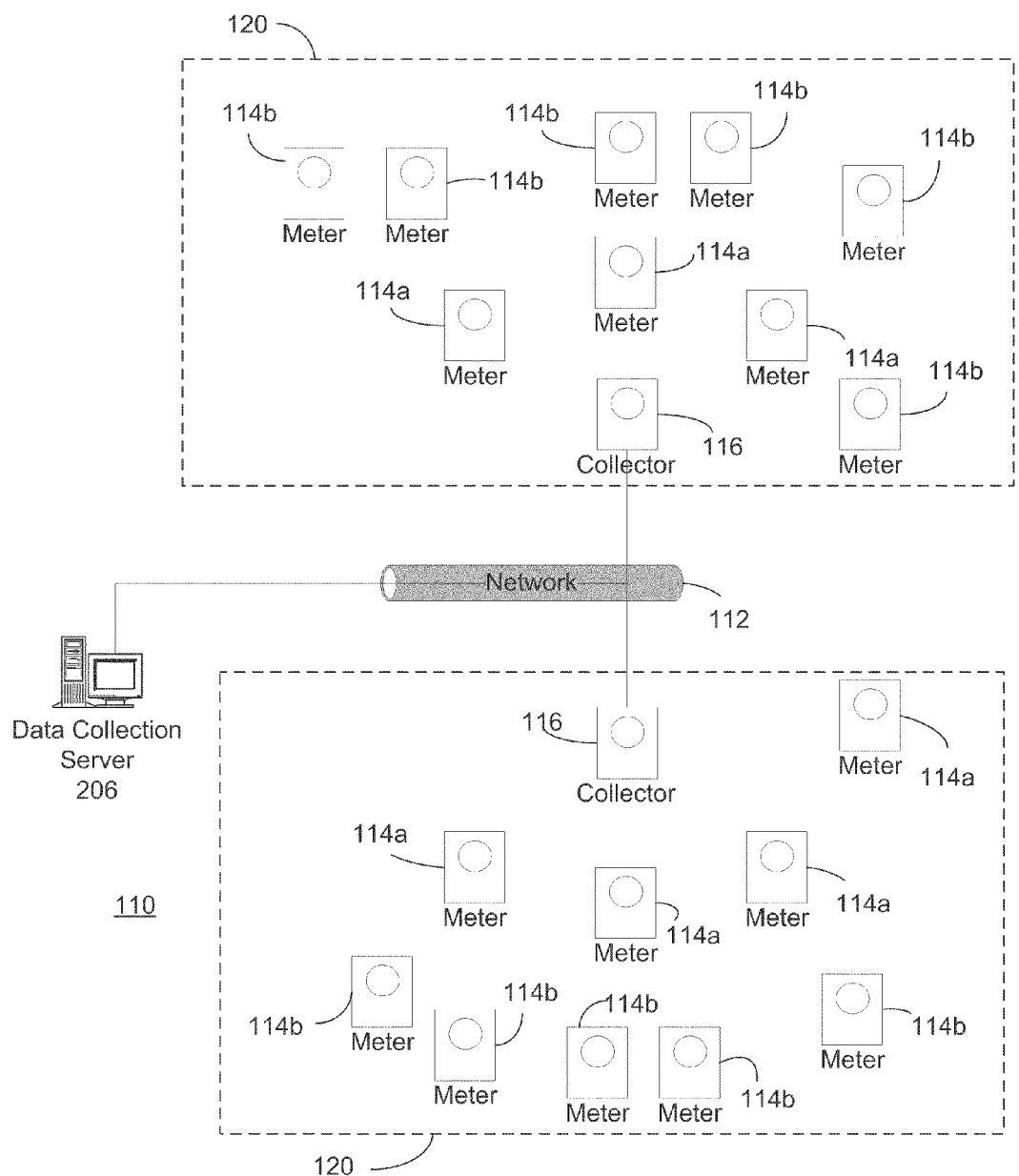
FIG. 3 is a diagram of an exemplary metering system.

FIG. 3 provides a diagram of one exemplary metering system 110. System 110 comprises a plurality of meters 114, which are operable to sense and record consumption or usage of a service or commodity such as, for example, electricity, water, or gas. Meters 114 may be located at customer premises such as, for example, a home or place of business. Meters 114 comprise circuitry for measuring the consumption of the service or commodity being consumed at their respective locations and for generating data reflecting the consumption, as well as other data related thereto. Meters 114 may also comprise circuitry for wirelessly transmitting data generated by the meter to a remote location. Meters 114 may further comprise circuitry for receiving data, commands or instructions wirelessly as well. Meters that are operable to both receive and transmit data may be referred to as "bi-directional" or "two-way" meters, while meters that are only capable of transmitting data may be referred to as "transmit-only" or "one-way" meters. In bi-directional meters, the circuitry for transmitting and receiving may comprise a transceiver. In an illustrative embodiment, meters 114 may be, for example, electricity meters manufactured by Elster Electricity, LLC and marketed under the tradename REX.

System 110 further comprises collectors 116. In one embodiment, collectors 116 are also meters operable to detect and record usage of a service or commodity such as, for example, electricity, water, or gas. In addition, collectors 116 are operable to send data to and receive data from meters 114. Thus, like the meters 114, the collectors 116 may comprise both circuitry for measuring the consumption of a service or commodity and for generating data reflecting the consumption and circuitry for transmitting and receiving data. In one embodiment, collector 116 and meters 114 communicate with and amongst one another using any one of several wireless techniques such as, for example, frequency hopping spread spectrum (FHSS) and direct sequence spread spectrum (DSSS).

A collector 116 and the meters 114 with which it communicates define a subnet/LAN 120 of system 110. As used herein, meters 114 and collectors 116 may be referred to as "nodes" in the subnet 120. In each subnet/LAN 120, each meter transmits data related to consumption of the commodity being metered at the meter's location. The collector 116 receives the data transmitted by each meter 114, effectively "collecting" it, and then periodically transmits the data from all of the meters in the subnet/LAN 120 to a data collection server 206. The data collection server 206 stores the data for analysis and preparation of bills, for example. The data collection server 206 may be a specially programmed general purpose computing system and may communicate with collectors 116 via a network 112. The network 112 may comprise any form of network, including a wireless network or a fixed-wire network, such as a local area network (LAN), a wide area network, the Internet, an intranet, a telephone network, such as the public switched telephone network (PSTN), a Frequency Hopping Spread Spectrum (FHSS) radio network, a mesh network, a Wi-Fi (802.11) network, a Wi-Max (802.16) network, a land line (POTS) network, or any combination of the above.

Figure 4:
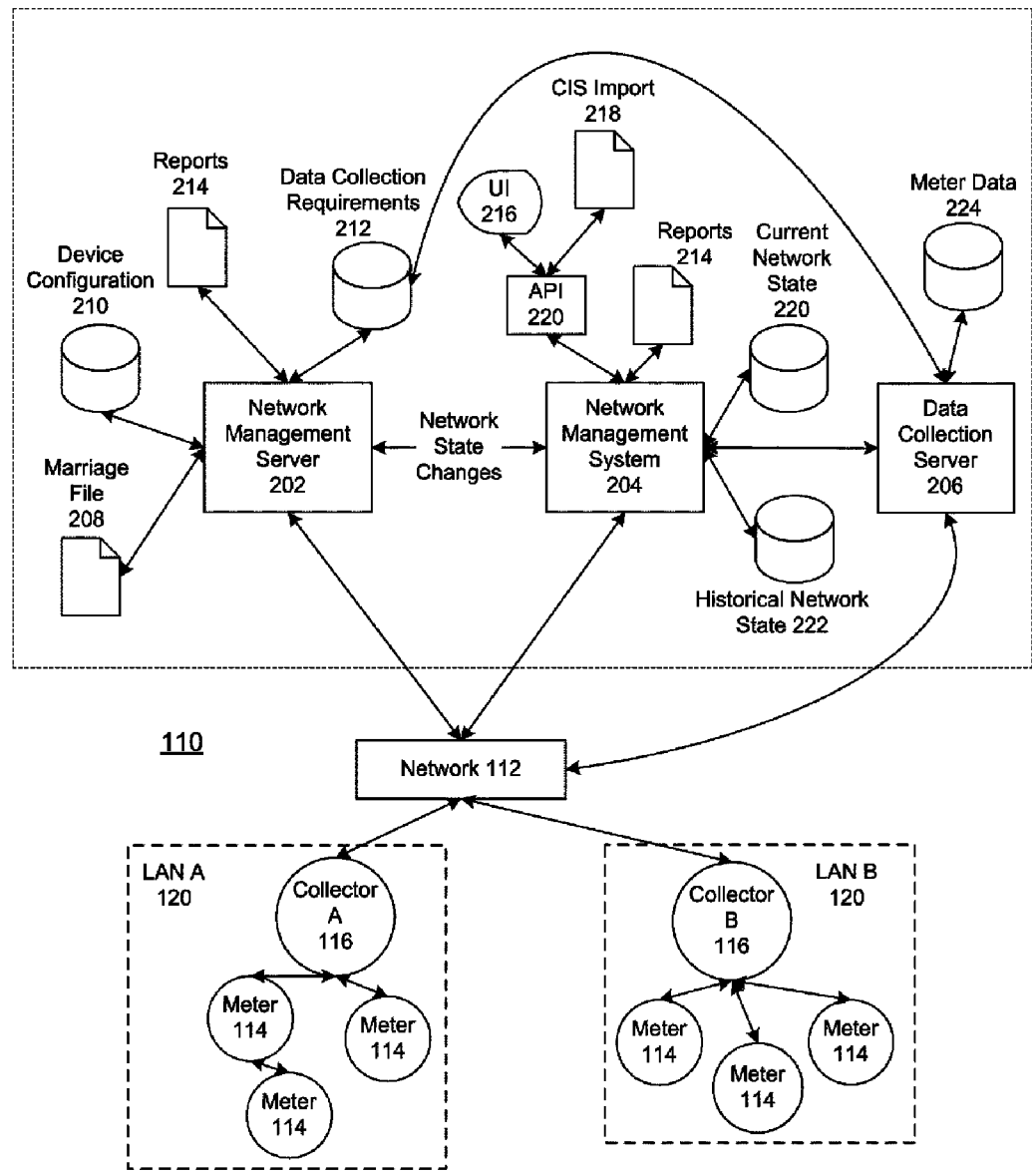
FIG. 4 expands upon the diagram of FIG. 3 and illustrates an exemplary metering system in greater detail.

Referring now to FIG. 4, further details of the metering system 110 are shown. Typically, the system will be operated by a utility company or a company providing information technology services to a utility company. As shown, the system 110 comprises a network management server 202, a network management system (NMS) 204 and the data collection server 206 that together manage one or more subnets/LANs 120 and their constituent nodes. The NMS 204 tracks changes in network state, such as new nodes registering/unregistering with the system 110, node communication paths changing, etc. This information is collected for each subnet/LAN 120 and is detected and forwarded to the network management server 202 and data collection server 206.

Each of the meters 114 and collectors 116 is assigned an identifier (LAN ID) that uniquely identifies that meter or collector on its subnet/LAN 120. In this embodiment, communication between nodes (i.e., the collectors and meters) and the system 110 is accomplished using the LAN ID. However, it is preferable for operators of a utility to query and communicate with the nodes using their own identifiers. To this end, a marriage file 208 may be used to correlate a utility's identifier for a node (e.g., a utility serial number) with both a manufacturer serial number (i.e., a serial number assigned by the manufacturer of the meter) and the LAN ID for each node in the subnet/LAN 120. In this manner, the utility can refer to the meters and collectors by the utilities identifier, while the system can employ the LAN ID for the purpose of designating particular meters during system communications.

A device configuration database 210 stores configuration information regarding the nodes. For example, in the metering system 200, the device configuration database may include data regarding time of use (TOU) switchpoints, etc. for the meters 114 and collectors 116 communicating in the system 110. A data collection requirements database 212 contains information regarding the data to be collected on a per node basis. For example, a utility may specify that metering data such as load profile, demand, TOU, etc. is to be collected from particular meter(s) 114a. Reports 214 containing information on the network configuration may be automatically generated or in accordance with a utility request.

The network management system (NMS) 204 maintains a database describing the current state of the global fixed network system (current network state 220) and a database describing the historical state of the system (historical network state 222). The current network state 220 contains data regarding current meter-to-collector assignments, etc. for each subnet/LAN 120. The historical network state 222 is a database from which the state of the network at a particular point in the past can be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may also be implemented. In addition, the data collection requirements stored in the database 212 may be set via the user interface 216 or CIS 218.

The data collection server 206 collects data from the nodes (e.g., collectors 116) and stores the data in a database 224. The data includes metering information, such as energy consumption and may be used for billing purposes, etc. by a utility provider.

The network management server 202, network management system 204 and data collection server 206 communicate with the nodes in each subnet/LAN 120 via network 110.

Figure 5A:
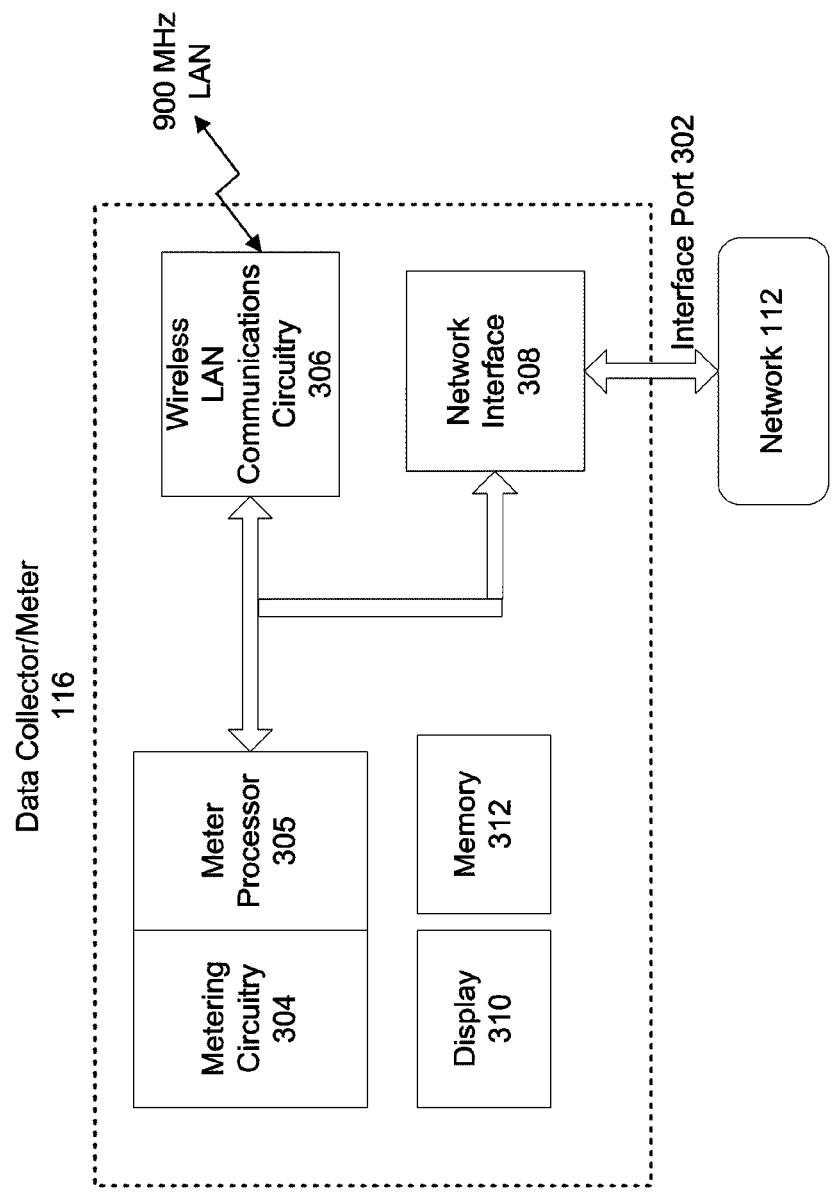
FIG. 5 is a block diagram illustrating an exemplary collector.

FIG. 5A is a block diagram illustrating further details of one embodiment of a collector 116. Although certain components are designated and discussed with reference to FIG. 5A, it should be appreciated that the invention is not limited to such components. In fact, various other components typically found in an electronic meter may be a part of collector 116, but have not been shown in FIG. 3A for the purposes of clarity and brevity. Also, the invention may use other components to accomplish the operation of collector 116. The components that are shown and the functionality described for collector 116 are provided as examples, and are not meant to be exclusive of other components or other functionality.

As shown in FIG. 5A, collector 116 may comprise metering circuitry 304 that performs measurement of consumption of a service or commodity and a processor 305 that controls the overall operation of the metering functions of the collector 116. The collector 116 may further comprise a display 310 for displaying information such as measured quantities and meter status and a memory 312 for storing data. The collector 116 further comprises wireless LAN communications circuitry 306 for communicating wirelessly with the meters 114 in a subnet/LAN and a network interface 308 for communication over the network 112.

In one embodiment, the metering circuitry 304, processor 305, display 310 and memory 312 are implemented using an A3 ALPHA meter available from Elster Electricity, Inc. In that embodiment, the wireless LAN communications circuitry 306 may be implemented by a LAN Option Board (e.g., a 900 MHz two-way radio) installed within the A3 ALPHA meter, and the network interface 308 may be implemented by a WAN Option Board (e.g., a telephone modem) also installed within the A3 ALPHA meter. In this embodiment, the WAN Option Board 308 routes messages from network 112 (via interface port 302) to either the meter processor 305 or the LAN Option Board 306. LAN Option Board 306 may use a transceiver (not shown), for example a 900 MHz radio, to communicate data to meters 114. Also, LAN Option Board 306 may have sufficient memory to store data received from meters 114. This data may include, but is not limited to the following: current billing data (e.g., the present values stored and displayed by meters 114), previous billing period data, previous season data, and load profile data.

LAN Option Board 306 may be capable of synchronizing its time to a real time clock (not shown) in A3 ALPHA meter, thereby synchronizing the LAN reference time to the time in the meter. The processing necessary to carry out the communication functionality and the collection and storage of metering data of the collector 116 may be handled by the processor 305 and/or additional processors (not shown) in the LAN Option Board 306 and the WAN Option Board 308.

The responsibility of a collector 116 is wide and varied. Generally, collector 116 is responsible for managing, processing and routing data communicated between the collector and network 112 and between the collector and meters 114. Collector 116 may continually or intermittently read the current data from meters 114 and store the data in a database (not shown) in collector 116. Such current data may include but is not limited to the total kWh usage, the Time-Of-Use (TOU) kWh usage, peak kW demand, and other energy consumption measurements and status information. Collector 116 also may read and store previous billing and previous season data from meters 114 and store the data in the database in collector 116. The database may be implemented as one or more tables of data within the collector 116.

Figure 5B:
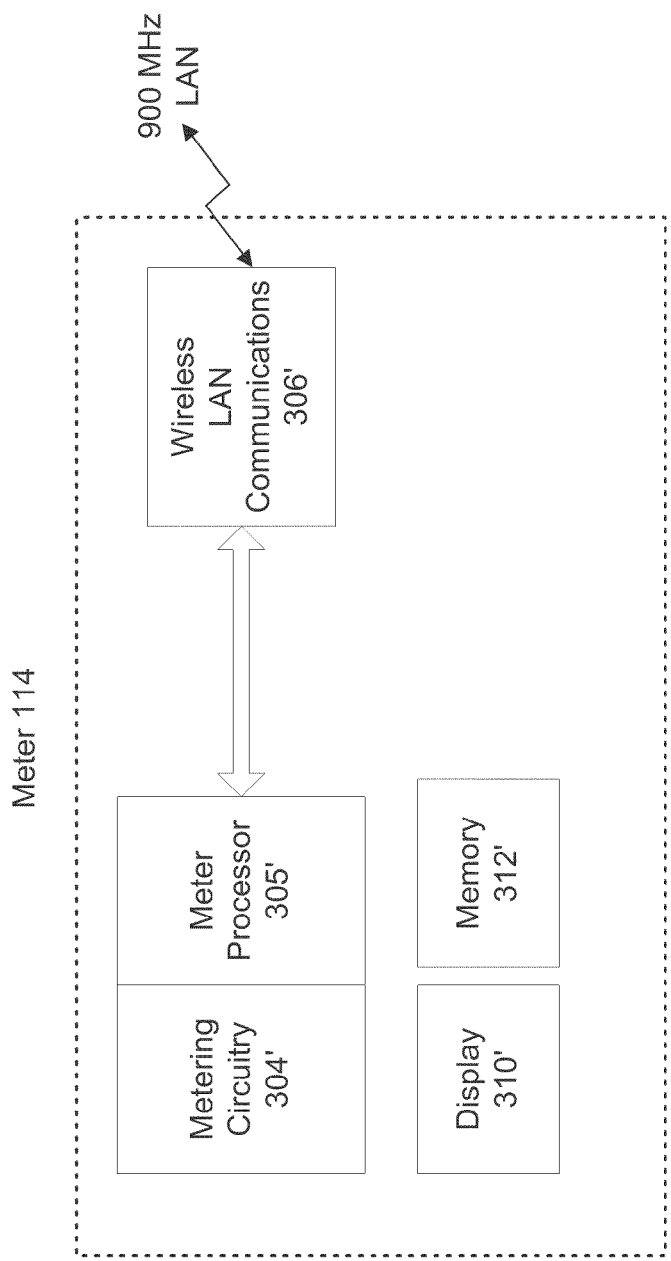

FIG. 5B is a block diagram of an exemplary embodiment of a meter 114 that may operate in the system 110 of FIGS. 3 and 4. As shown, the meter 114 comprises metering circuitry 304' for measuring the amount of a service or commodity that is consumed, a processor 305' that controls the overall functions of the meter, a display 310' for displaying meter data and status information, and a memory 312' for storing data and program instructions. The meter 114 further comprises wireless communications circuitry 306' for transmitting and receiving data to/from other meters 114 or a collector 116.

Referring again to FIG. 3, in the exemplary embodiment shown, a collector 116 directly communicates with only a subset of the plurality of meters 114 in its particular subnet/LAN. Meters 114 with which collector 116 directly communicates may be referred to as "level one" meters 114a. The level one meters 114a are said to be one "hop" from the collector 116. Communications between collector 116 and meters 114 other than level one meters 114a are relayed through the level one meters 114a. Thus, the level one meters 114a operate as repeaters for communications between collector 116 and meters 114 located further away in subnet 120.

Each level one meter 114a typically will only be in range to directly communicate with only a subset of the remaining meters 114 in the subnet 120. The meters 114 with which the level one meters 114a directly communicate may be referred to as level two meters 114b. Level two meters 114b are one "hop" from level one meters 114a, and therefore two "hops" from collector 116. Level two meters 114b operate as repeaters for communications between the level one meters 114a and meters 114 located further away from collector 116 in the subnet 120.

While only three levels of meters are shown (collector 116, first level 114a, second level 114b) in FIG. 3, a subnet 120 may comprise any number of levels of meters 114. For example, a subnet 120 may comprise one level of meters but might also comprise eight or more levels of meters 114. In an embodiment wherein a subnet comprises eight levels of meters 114, as many as 1024 meters might be registered with a single collector 116.

As mentioned above, each meter 114 and collector 116 that is installed in the system 110 has a unique identifier (LAN ID) stored thereon that uniquely identifies the device from all other devices in the system 110. Additionally, meters 114 operating in a subnet 120 comprise information including the following: data identifying the collector with which the meter is registered; the level in the subnet at which the meter is located; the repeater meter at the prior level with which the meter communicates to send and receive data to/from the collector; an identifier indicating whether the meter is a repeater for other nodes in the subnet; and if the meter operates as a repeater, the identifier that uniquely identifies the repeater within the particular subnet, and the number of meters for which it is a repeater. Collectors 116 have stored thereon all of this same data for all meters 114 that are registered therewith. Thus, collector 116 comprises data identifying all nodes registered therewith as well as data identifying the registered path by which data is communicated from the collector to each node. Each meter 114 therefore has a designated communications path to the collector that is either a direct path (e.g., all level one nodes) or an indirect path through one or more intermediate nodes that serve as repeaters.

Information is transmitted in this embodiment in the form of packets. For most network tasks such as, for example, reading meter data, collector 116 communicates with meters 114 in the subnet 120 using point-to-point transmissions. For example, a message or instruction from collector 116 is routed through the designated set of repeaters to the desired meter 114. Similarly, a meter 114 communicates with collector 116 through the same set of repeaters, but in reverse.

In some instances, however, collector 116 may need to quickly communicate information to all meters 114 located in its subnet 120. Accordingly, collector 116 may issue a broadcast message that is meant to reach all nodes in the subnet 120. The broadcast message may be referred to as a "flood broadcast message." A flood broadcast originates at collector 116 and propagates through the entire subnet 120 one level at a time. For example, collector 116 may transmit a flood broadcast to all first level meters 114a. The first level meters 114a that receive the message pick a random time slot and retransmit the broadcast message to second level meters 114b. Any second level meter 114b can accept the broadcast, thereby providing better coverage from the collector out to the end point meters. Similarly, the second level meters 114b that receive the broadcast message pick a random time slot and communicate the broadcast message to third level meters. This process continues out until the end nodes of the subnet. Thus, a broadcast message gradually propagates outward from the collector to the nodes of the subnet 120.

The flood broadcast packet header contains information to prevent nodes from repeating the flood broadcast packet more than once per level. For example, within a flood broadcast message, a field might exist that indicates to meters/nodes which receive the message, the level of the subnet the message is located; only nodes at that particular level may re-broadcast the message to the next level. If the collector broadcasts a flood message with a level of 1, only level 1 nodes may respond. Prior to re-broadcasting the flood message, the level 1 nodes increment the field to 2 so that only level 2 nodes respond to the broadcast. Information within the flood broadcast packet header ensures that a flood broadcast will eventually die out.

Generally, a collector 116 issues a flood broadcast several times, e.g. five times, successively to increase the probability that all meters in the subnet 120 receive the broadcast. A delay is introduced before each new broadcast to allow the previous broadcast packet time to propagate through all levels of the subnet.

Meters 114 may have a clock formed therein. However, meters 114 often undergo power interruptions that can interfere with the operation of any clock therein. Accordingly, the clocks internal to meters 114 cannot be relied upon to provide an accurate time reading. Having the correct time is necessary, however, when time of use metering is being employed. Indeed, in an embodiment, time of use schedule data may also be comprised in the same broadcast message as the time. Accordingly, collector 116 periodically flood broadcasts the real time to meters 114 in subnet 120. Meters 114 use the time broadcasts to stay synchronized with the rest of the subnet 120. In an illustrative embodiment, collector 116 broadcasts the time every 15 minutes. The broadcasts may be made near the middle of 15 minute clock boundaries that are used in performing load profiling and time of use (TOU) schedules so as to minimize time changes near these boundaries. Maintaining time synchronization is important to the proper operation of the subnet 120. Accordingly, lower priority tasks performed by collector 116 may be delayed while the time broadcasts are performed.

In an illustrative embodiment, the flood broadcasts transmitting time data may be repeated, for example, five times, so as to increase the probability that all nodes receive the time. Furthermore, where time of use schedule data is communicated in the same transmission as the timing data, the subsequent time transmissions allow a different piece of the time of use schedule to be transmitted to the nodes.

Exception messages are used in subnet 120 to transmit unexpected events that occur at meters 114 to collector 116. In an embodiment, the first 4 seconds of every 32-second period are allocated as an exception window for meters 114 to transmit exception messages. Meters 114 transmit their exception messages early enough in the exception window so the message has time to propagate to collector 116 before the end of the exception window. Collector 116 may process the exceptions after the 4-second exception window. Generally, a collector 116 acknowledges exception messages, and collector 116 waits until the end of the exception window to send this acknowledgement.

In an illustrative embodiment, exception messages are configured as one of three different types of exception messages: local exceptions, which are handled directly by the collector 116 without intervention from data collection server 206; an immediate exception, which is generally relayed to data collection server 206 under an expedited schedule; and a daily exception, which is communicated to the communication server 122 on a regular schedule.

Exceptions are processed as follows. When an exception is received at collector 116, the collector 116 identifies the type of exception that has been received. If a local exception has been received, collector 116 takes an action to remedy the problem. For example, when collector 116 receives an exception requesting a "node scan request" such as discussed below, collector 116 transmits a command to initiate a scan procedure to the meter 114 from which the exception was received.

If an immediate exception type has been received, collector 116 makes a record of the exception. An immediate exception might identify, for example, that there has been a power outage. Collector 116 may log the receipt of the exception in one or more tables or files. In an illustrative example, a record of receipt of an immediate exception is made in a table referred to as the "Immediate Exception Log Table." Collector 116 then waits a set period of time before taking further action with respect to the immediate exception. For example, collector 116 may wait 64 seconds. This delay period allows the exception to be corrected before communicating the exception to the data collection server 206. For example, where a power outage was the cause of the immediate exception, collector 116 may wait a set period of time to allow for receipt of a message indicating the power outage has been corrected.

If the exception has not been corrected, collector 116 communicates the immediate exception to data collection server 206. For example, collector 116 may initiate a dial-up connection with data collection server 206 and download the exception data. After reporting an immediate exception to data collection server 206, collector 116 may delay reporting any additional immediate exceptions for a period of time such as ten minutes. This is to avoid reporting exceptions from other meters 114 that relate to, or have the same cause as, the exception that was just reported.

If a daily exception was received, the exception is recorded in a file or a database table. Generally, daily exceptions are occurrences in the subnet 120 that need to be reported to data collection server 206, but are not so urgent that they need to be communicated immediately. For example, when collector 116 registers a new meter 114 in subnet 120, collector 116 records a daily exception identifying that the registration has taken place. In an illustrative embodiment, the exception is recorded in a database table referred to as the "Daily Exception Log Table." Collector 116 communicates the daily exceptions to data collection server 206. Generally, collector 116 communicates the daily exceptions once every 24 hours.

In the present embodiment, a collector assigns designated communications paths to meters with bi-directional communication capability, and may change the communication paths for previously registered meters if conditions warrant. For example, when a collector 116 is initially brought into system 110, it needs to identify and register meters in its subnet 120. A "node scan" refers to a process of communication between a collector 116 and meters 114 whereby the collector may identify and register new nodes in a subnet 120 and allow previously registered nodes to switch paths. A collector 116 can implement a node scan on the entire subnet, referred to as a "full node scan," or a node scan can be performed on specially identified nodes, referred to as a "node scan retry."

A full node scan may be performed, for example, when a collector is first installed. The collector 116 must identify and register nodes from which it will collect usage data. The collector 116 initiates a node scan by broadcasting a request, which may be referred to as a Node Scan Procedure request. Generally, the Node Scan Procedure request directs that all unregistered meters 114 or nodes that receive the request respond to the collector 116. The request may comprise information such as the unique address of the collector that initiated the procedure. The signal by which collector 116 transmits this request may have limited strength and therefore is detected only at meters 114 that are in proximity of collector 116. Meters 114 that receive the Node Scan Procedure request respond by transmitting their unique identifier as well as other data.

For each meter from which the collector receives a response to the Node Scan Procedure request, the collector tries to qualify the communications path to that meter before registering the meter with the collector. That is, before registering a meter, the collector 116 attempts to determine whether data communications with the meter will be sufficiently reliable. In one embodiment, the collector 116 determines whether the communication path to a responding meter is sufficiently reliable by comparing a Received Signal Strength Indication (RSSI) value (i.e., a measurement of the received radio signal strength) measured with respect to the received response from the meter to a selected threshold value. For example, the threshold value may be −60 dBm. RSSI values above this threshold would be deemed sufficiently reliable. In another embodiment, qualification is performed by transmitting a predetermined number of additional packets to the meter, such as ten packets, and counting the number of acknowledgements received back from the meter. If the number of acknowledgments received is greater than or equal to a selected threshold (e.g., 8 out of 10), then the path is considered to be reliable. In other embodiments, a combination of the two qualification techniques may be employed.

If the qualification threshold is not met, the collector 116 may add an entry for the meter to a "Straggler Table." The entry includes the meter's LAN ID, its qualification score (e.g., 5 out of 10; or its RSSI value), its level (in this case level one) and the unique ID of its parent (in this case the collector's ID).

If the qualification threshold is met or exceeded, the collector 116 registers the node. Registering a meter 114 comprises updating a list of the registered nodes at collector 116. For example, the list may be updated to identify the meter's system-wide unique identifier and the communication path to the node. Collector 116 also records the meter's level in the subnet (i.e. whether the meter is a level one node, level two node, etc.), whether the node operates as a repeater, and if so, the number of meters for which it operates as a repeater. The registration process further comprises transmitting registration information to the meter 114. For example, collector 116 forwards to meter 114 an indication that it is registered, the unique identifier of the collector with which it is registered, the level the meter exists at in the subnet, and the unique identifier of its parent meter that will server as a repeater for messages the meter may send to the collector. In the case of a level one node, the parent is the collector itself. The meter stores this data and begins to operate as part of the subnet by responding to commands from its collector 116.

Qualification and registration continues for each meter that responds to the collector's initial Node Scan Procedure request. The collector 116 may rebroadcast the Node Scan Procedure additional times so as to insure that all meters 114 that may receive the Node Scan Procedure have an opportunity for their response to be received and the meter qualified as a level one node at collector 116.

The node scan process then continues by performing a similar process as that described above at each of the now registered level one nodes. This process results in the identification and registration of level two nodes. After the level two nodes are identified, a similar node scan process is performed at the level two nodes to identify level three nodes, and so on.

Specifically, to identify and register meters that will become level two meters, for each level one meter, in succession, the collector 116 transmits a command to the level one meter, which may be referred to as an "Initiate Node Scan Procedure" command. This command instructs the level one meter to perform its own node scan process. The request comprises several data items that the receiving meter may use in completing the node scan. For example, the request may comprise the number of timeslots available for responding nodes, the unique address of the collector that initiated the request, and a measure of the reliability of the communications between the target node and the collector. As described below, the measure of reliability may be employed during a process for identifying more reliable paths for previously registered nodes.

The meter that receives the Initiate Node Scan Response request responds by performing a node scan process similar to that described above. More specifically, the meter broadcasts a request to which all unregistered nodes may respond. The request comprises the number of timeslots available for responding nodes (which is used to set the period for the node to wait for responses), the unique address of the collector that initiated the node scan procedure, a measure of the reliability of the communications between the sending node and the collector (which may be used in the process of determining whether a meter's path may be switched as described below), the level within the subnet of the node sending the request, and an RSSI threshold (which may also be used in the process of determining whether a registered meter's path may be switched). The meter issuing the node scan request then waits for and receives responses from unregistered nodes. For each response, the meter stores in memory the unique identifier of the responding meter. This information is then transmitted to the collector.

For each unregistered meter that responded to the node scan issued by the level one meter, the collector attempts again to determine the reliability of the communication path to that meter. In one embodiment, the collector sends a "Qualify Nodes Procedure" command to the level one node which instructs the level one node to transmit a predetermined number of additional packets to the potential level two node and to record the number of acknowledgements received back from the potential level two node. This qualification score (e.g., 8 out of 10) is then transmitted back to the collector, which again compares the score to a qualification threshold. In other embodiments, other measures of the communications reliability may be provided, such as an RSSI value.

If the qualification threshold is not met, then the collector adds an entry for the node in the Straggler Table, as discussed above. However, if there already is an entry in the Straggler Table for the node, the collector will update that entry only if the qualification score for this node scan procedure is better than the recorded qualification score from the prior node scan that resulted in an entry for the node.

If the qualification threshold is met or exceeded, the collector 116 registers the node. Again, registering a meter 114 at level two comprises updating a list of the registered nodes at collector 116. For example, the list may be updated to identify the meter's unique identifier and the level of the meter in the subnet. Additionally, the collector's 116 registration information is updated to reflect that the meter 114 from which the scan process was initiated is identified as a repeater (or parent) for the newly registered node. The registration process further comprises transmitting information to the newly registered meter as well as the meter that will serve as a repeater for the newly added node. For example, the node that issued the node scan response request is updated to identify that it operates as a repeater and, if it was previously registered as a repeater, increments a data item identifying the number of nodes for which it serves as a repeater. Thereafter, collector 116 forwards to the newly registered meter an indication that it is registered, an identification of the collector 116 with which it is registered, the level the meter exists at in the subnet, and the unique identifier of the node that will serve as its parent, or repeater, when it communicates with the collector 116.

The collector then performs the same qualification procedure for each other potential level two node that responded to the level one node's node scan request. Once that process is completed for the first level one node, the collector initiates the same procedure at each other level one node until the process of qualifying and registering level two nodes has been completed at each level one node. Once the node scan procedure has been performed by each level one node, resulting in a number of level two nodes being registered with the collector, the collector will then send the Initiate Node Scan Response command to each level two node, in turn. Each level two node will then perform the same node scan procedure as performed by the level one nodes, potentially resulting in the registration of a number of level three nodes. The process is then performed at each successive node, until a maximum number of levels is reached (e.g., seven levels) or no unregistered nodes are left in the subnet.

It will be appreciated that in the present embodiment, during the qualification process for a given node at a given level, the collector qualifies the last "hop" only. For example, if an unregistered node responds to a node scan request from a level four node, and therefore, becomes a potential level five node, the qualification score for that node is based on the reliability of communications between the level four node and the potential level five node (i.e., packets transmitted by the level four node versus acknowledgments received from the potential level five node), not based on any measure of the reliability of the communications over the full path from the collector to the potential level five node. In other embodiments, of course, the qualification score could be based on the full communication path.

At some point, each meter will have an established communication path to the collector which will be either a direct path (i.e., level one nodes) or an indirect path through one or more intermediate nodes that serve as repeaters. If during operation of the network, a meter registered in this manner fails to perform adequately, it may be assigned a different path or possibly to a different collector as described below.

As previously mentioned, a full node scan may be performed when a collector 116 is first introduced to a network. At the conclusion of the full node scan, a collector 116 will have registered a set of meters 114 with which it communicates and reads metering data. Full node scans might be periodically performed by an installed collector to identify new meters 114 that have been brought on-line since the last node scan and to allow registered meters to switch to a different path.

In addition to the full node scan, collector 116 may also perform a process of scanning specific meters 114 in the subnet 120, which is referred to as a "node scan retry." For example, collector 116 may issue a specific request to a meter 114 to perform a node scan outside of a full node scan when on a previous attempt to scan the node, the collector 116 was unable to confirm that the particular meter 114 received the node scan request. Also, a collector 116 may request a node scan retry of a meter 114 when during the course of a full node scan the collector 116 was unable to read the node scan data from the meter 114. Similarly, a node scan retry will be performed when an exception procedure requesting an immediate node scan is received from a meter 114.

The system 110 also automatically reconfigures to accommodate a new meter 114 that may be added. More particularly, the system identifies that the new meter has begun operating and identifies a path to a collector 116 that will become responsible for collecting the metering data. Specifically, the new meter will broadcast an indication that it is unregistered. In one embodiment, this broadcast might be, for example, embedded in, or relayed as part of a request for an update of the real time as described above. The broadcast will be received at one of the registered meters 114 in proximity to the meter that is attempting to register. The registered meter 114 forwards the time to the meter that is attempting to register. The registered node also transmits an exception request to its collector 116 requesting that the collector 116 implement a node scan, which presumably will locate and register the new meter. The collector 116 then transmits a request that the registered node perform a node scan. The registered node will perform the node scan, during which it requests that all unregistered nodes respond. Presumably, the newly added, unregistered meter will respond to the node scan. When it does, the collector will then attempt to qualify and then register the new node in the same manner as described above.

Once a communication path between the collector and a meter is established, the meter can begin transmitting its meter data to the collector and the collector can transmit data and instructions to the meter. As mentioned above, data is transmitted in packets. "Outbound" packets are packets transmitted from the collector to a meter at a given level. In one embodiment, outbound packets contain the following fields, but other fields may also be included:

Length—the length of the packet;
SrcAddr—source address—in this case, the ID of the collector;
DestAddr—the LAN ID of the meter to which the packet addressed;
RptPath—the communication path to the destination meter (i.e., the list of identifiers of each repeater in the path from the collector to the destination node); and
Data—the payload of the packet.

The packet may also include integrity check information (e.g., CRC), a pad to fill-out unused portions of the packet and other control information. When the packet is transmitted from the collector, it will only be forwarded on to the destination meter by those repeater meters whose identifiers appear in the RptPath field. Other meters that may receive the packet, but that are not listed in the path identified in the RptPath field will not repeat the packet.

"Inbound" packets are packets transmitted from a meter at a given level to the collector. In one embodiment, inbound packets contain the following fields, but other fields may also be included:

Length—the length of the packet;
SrcAddr—source address—the address of the meter that initiated the packet;
DestAddr—the ID of the collector to which the packet is to be transmitted;
RptAddr—the ID of the parent node that serves as the next repeater for the sending node;
Data—the payload of the packet;

Because each meter knows the identifier of its parent node (i.e., the node in the next lower level that serves as a repeater for the present node), an inbound packet need only identify who is the next parent. When a node receives an inbound packet, it checks to see if the RptAddr matches its own identifier. If not, it discards the packet. If so, it knows that it is supposed to forward the packet on toward the collector. The node will then replace the RptAddr field with the identifier of its own parent and will then transmit the packet so that its parent will receive it. This process will continue through each repeater at each successive level until the packet reaches the collector.

For example, suppose a meter at level three initiates transmission of a packet destined for its collector. The level three node will insert in the RptAddr field of the inbound packet the identifier of the level two node that serves as a repeater for the level three node. The level three node will then transmit the packet. Several level two nodes may receive the packet, but only the level two node having an identifier that matches the identifier in the RptAddr field of the packet will acknowledge it. The other will discard it. When the level two node with the matching identifier receives the packet, it will replace the RptAddr field of the packet with the identifier of the level one packet that serves as a repeater for that level two packet, and the level two packet will then transmit the packet. This time, the level one node having the identifier that matches the RptAddr field will receive the packet. The level one node will insert the identifier of the collector in the RptAddr field and will transmit the packet. The collector will then receive the packet to complete the transmission.

A collector 116 periodically retrieves meter data from the meters that are registered with it. For example, meter data may be retrieved from a meter every 4 hours. Where there is a problem with reading the meter data on the regularly scheduled interval, the collector will try to read the data again before the next regularly scheduled interval. Nevertheless, there may be instances wherein the collector 116 is unable to read metering data from a particular meter 114 for a prolonged period of time. The meters 114 store an indication of when they are read by their collector 116 and keep track of the time since their data has last been collected by the collector 116. If the length of time since the last reading exceeds a defined threshold, such as for example, 18 hours, presumably a problem has arisen in the communication path between the particular meter 114 and the collector 116. Accordingly, the meter 114 changes its status to that of an unregistered meter and attempts to locate a new path to a collector 116 via the process described above for a new node. Thus, the exemplary system is operable to reconfigure itself to address inadequacies in the system.

In some instances, while a collector 116 may be able to retrieve data from a registered meter 114 occasionally, the level of success in reading the meter may be inadequate. For example, if a collector 116 attempts to read meter data from a meter 114 every 4 hours but is able to read the data, for example, only 70 percent of the time or less, it may be desirable to find a more reliable path for reading the data from that particular meter. Where the frequency of reading data from a meter 114 falls below a desired success level, the collector 116 transmits a message to the meter 114 to respond to node scans going forward. The meter 114 remains registered but will respond to node scans in the same manner as an unregistered node as described above. In other embodiments, all registered meters may be permitted to respond to node scans, but a meter will only respond to a node scan if the path to the collector through the meter that issued the node scan is shorter (i.e., less hops) than the meter's current path to the collector. A lesser number of hops is assumed to provide a more reliable communication path than a longer path. A node scan request always identifies the level of the node that transmits the request, and using that information, an already registered node that is permitted to respond to node scans can determine if a potential new path to the collector through the node that issued the node scan is shorter than the node's current path to the collector.

If an already registered meter 114 responds to a node scan procedure, the collector 116 recognizes the response as originating from a registered meter but that by re-registering the meter with the node that issued the node scan, the collector may be able to switch the meter to a new, more reliable path. The collector 116 may verify that the RSSI value of the node scan response exceeds an established threshold. If it does not, the potential new path will be rejected. However, if the RSSI threshold is met, the collector 116 will request that the node that issued the node scan perform the qualification process described above (i.e., send a predetermined number of packets to the node and count the number of acknowledgements received). If the resulting qualification score satisfies a threshold, then the collector will register the node with the new path. The registration process comprises updating the collector 116 and meter 114 with data identifying the new repeater (i.e. the node that issued the node scan) with which the updated node will now communicate. Additionally, if the repeater has not previously performed the operation of a repeater, the repeater would need to be updated to identify that it is a repeater. Likewise, the repeater with which the meter previously communicated is updated to identify that it is no longer a repeater for the particular meter 114. In other embodiments, the threshold determination with respect to the RSSI value may be omitted. In such embodiments, only the qualification of the last "hop" (i.e., sending a predetermined number of packets to the node and counting the number of acknowledgements received) will be performed to determine whether to accept or reject the new path.

In some instances, a more reliable communication path for a meter may exist through a collector other than that with which the meter is registered. A meter may automatically recognize the existence of the more reliable communication path, switch collectors, and notify the previous collector that the change has taken place. The process of switching the registration of a meter from a first collector to a second collector begins when a registered meter 114 receives a node scan request from a collector 116 other than the one with which the meter is presently registered. Typically, a registered meter 114 does not respond to node scan requests. However, if the request is likely to result in a more reliable transmission path, even a registered meter may respond. Accordingly, the meter determines if the new collector offers a potentially more reliable transmission path. For example, the meter 114 may determine if the path to the potential new collector 116 comprises fewer hops than the path to the collector with which the meter is registered. If not, the path may not be more reliable and the meter 114 will not respond to the node scan. The meter 114 might also determine if the RSSI of the node scan packet exceeds an RSSI threshold identified in the node scan information. If so, the new collector may offer a more reliable transmission path for meter data. If not, the transmission path may not be acceptable and the meter may not respond. Additionally, if the reliability of communication between the potential new collector and the repeater that would service the meter meets a threshold established when the repeater was registered with its existing collector, the communication path to the new collector may be more reliable. If the reliability does not exceed this threshold, however, the meter 114 does not respond to the node scan.

If it is determined that the path to the new collector may be better than the path to its existing collector, the meter 114 responds to the node scan. Included in the response is information regarding any nodes for which the particular meter may operate as a repeater. For example, the response might identify the number of nodes for which the meter serves as a repeater.

The collector 116 then determines if it has the capacity to service the meter and any meters for which it operates as a repeater. If not, the collector 116 does not respond to the meter that is attempting to change collectors. If, however, the collector 116 determines that it has capacity to service the meter 114, the collector 116 stores registration information about the meter 114. The collector 116 then transmits a registration command to meter 114. The meter 114 updates its registration data to identify that it is now registered with the new collector. The collector 116 then communicates instructions to the meter 114 to initiate a node scan request. Nodes that are unregistered, or that had previously used meter 114 as a repeater respond to the request to identify themselves to collector 116. The collector registers these nodes as is described above in connection with registering new meters/nodes.

Under some circumstances it may be necessary to change a collector. For example, a collector may be malfunctioning and need to be taken off-line. Accordingly, a new communication path must be provided for collecting meter data from the meters serviced by the particular collector. The process of replacing a collector is performed by broadcasting a message to unregister, usually from a replacement collector, to all of the meters that are registered with the collector that is being removed from service. In one embodiment, registered meters may be programmed to only respond to commands from the collector with which they are registered. Accordingly, the command to unregister may comprise the unique identifier of the collector that is being replaced. In response to the command to unregister, the meters begin to operate as unregistered meters and respond to node scan requests. To allow the unregistered command to propagate through the subnet, when a node receives the command it will not unregister immediately, but rather remain registered for a defined period, which may be referred to as the "Time to Live". During this time to live period, the nodes continue to respond to application layer and immediate retries allowing the unregistration command to propagate to all nodes in the subnet. Ultimately, the meters register with the replacement collector using the procedure described above.

One of collector's 116 main responsibilities within subnet 120 is to retrieve metering data from meters 114. In one embodiment, collector 116 has as a goal to obtain at least one successful read of the metering data per day from each node in its subnet. Collector 116 attempts to retrieve the data from all nodes in its subnet 120 at a configurable periodicity. For example, collector 116 may be configured to attempt to retrieve metering data from meters 114 in its subnet 120 once every 4 hours. In greater detail, in one embodiment, the data collection process begins with the collector 116 identifying one of the meters 114 in its subnet 120. For example, collector 116 may review a list of registered nodes and identify one for reading. The collector 116 then communicates a command to the particular meter 114 that it forward its metering data to the collector 116. If the meter reading is successful and the data is received at collector 116, the collector 116 determines if there are other meters that have not been read during the present reading session. If so, processing continues. However, if all of the meters 114 in subnet 120 have been read, the collector waits a defined length of time, such as, for example, 4 hours, before attempting another read.

If during a read of a particular meter, the meter data is not received at collector 116, the collector 116 begins a retry procedure wherein it attempts to retry the data read from the particular meter. Collector 116 continues to attempt to read the data from the node until either the data is read or the next subnet reading takes place. In an embodiment, collector 116 attempts to read the data every 60 minutes. Thus, wherein a subnet reading is taken every 4 hours, collector 116 may issue three retries between subnet readings.

As set forth above, faults and other problems on an electrical distribution network may present a number of challenges for devices in a wireless network such as described in FIGS. 3 and 4. For example, when a fault condition occurs, it is often difficult to determine the extent of the power outage resulting from the fault and to develop a power restoration scheme. Another problem is that a fault condition may result in a number of network nodes being "stranded," meaning that the nodes remain powered after the fault but are unable to communicate with their assigned central node via their assigned communication path. For example, referring back to FIG. 2, a fault 530 has occurred between nodes 12 and 13, resulting in a loss of power at node 13. Unlike node 13, nodes 14-17 remain powered after the fault condition because they are on different power distribution lines than node 13. However, nodes 14-17 communicate with their assigned central node 510 via an assigned communication path through node 13. Thus, fault 530 results in the stranding of nodes 14-17. It should be noted here that, in addition to device nodes, a fault may result in a loss of power at one or more central nodes. Such a loss of power at a central node may result in the stranding of each of the central node's assigned device nodes that remain powered after the fault. It should also be noted here that, in addition to faults, nodes may become stranded due to other electrical distribution problems or to problems occurring during the restoration process itself.

In an embodiment, a bi-directional node may classify itself as stranded due to any one of three reasons. The first reason for being stranded, which may be referred to as "stranded by outage," occurs when a bi-directional node receives a power outage notification (e.g., "last gasp" notification) from an upstream node in the bi-directional node's assigned communication path. For example, just before node 13 loses power due to fault 530, node 13 may transmit a last gasp notification to node 14. Techniques for optimal transmission and propagation of these last gasp notifications will be described in detail below. The second reason for being stranded, which may be referred to as "stranded during restoration" occurs when a bi-directional node fails to receive any communication for greater than a threshold time period after a power restoration. The third reason for being stranded, which may be referred to as "stranded due to non-communication" occurs when a bi-directional node fails to receive any communication from a central node for greater than a threshold time period. When a node determines that it is stranded, it may set a flag to identify the reason therefore. If, after setting the flag, the stranded node hears from its central node through its assigned communication path, it may clear the stranded flag at that time.

When a node has determined that it is stranded, it can be configured to announce or broadcast a stranding notification to notify other nodes outside of its stranded fragment. This achieves greater path diversity within the wireless mesh communication network. Each node can be configured to independently "announce" or broadcast a stranding notification to any other node within range after a configurable time period. The broadcast stranding notification may include an identification of the stranded node, a sequence number, and the stranded reason. Based on the reason for the stranding and/or other possible factors, each node may be configured to report its stranding notification differently. For example, the amount of time to wait until the broadcast stranding notification is transmitted may vary based on the reason for the stranding and/or other possible factors.

If configured to initiate a broadcast stranding notification after a specified time for a specified a stranded condition, the stranded node may wait an additional random amount of time before generating the broadcast stranding notification to ensure randomization between stranded nodes. For example, a node may be configured to initiate a broadcast stranding notification for the "stranded during restoration" reason if the node fails to receive any communication for greater than 15 minutes after power restoration. In this case, immediately after power restoration, the node may set a "stranded during restoration" flag and begin a timer. If the node receives communication before the 15 minutes has expired, then the "stranded during restoration" flag will be cleared, the timer will be stopped, and no broadcast stranding notification will be sent. On the other hand, if no communication is received for greater than 15 minutes after power restoration, then the timer will expire. After expiration of the timer, the node will wait an additional random amount of time and then send the broadcast stranding notification.

Figure 6:
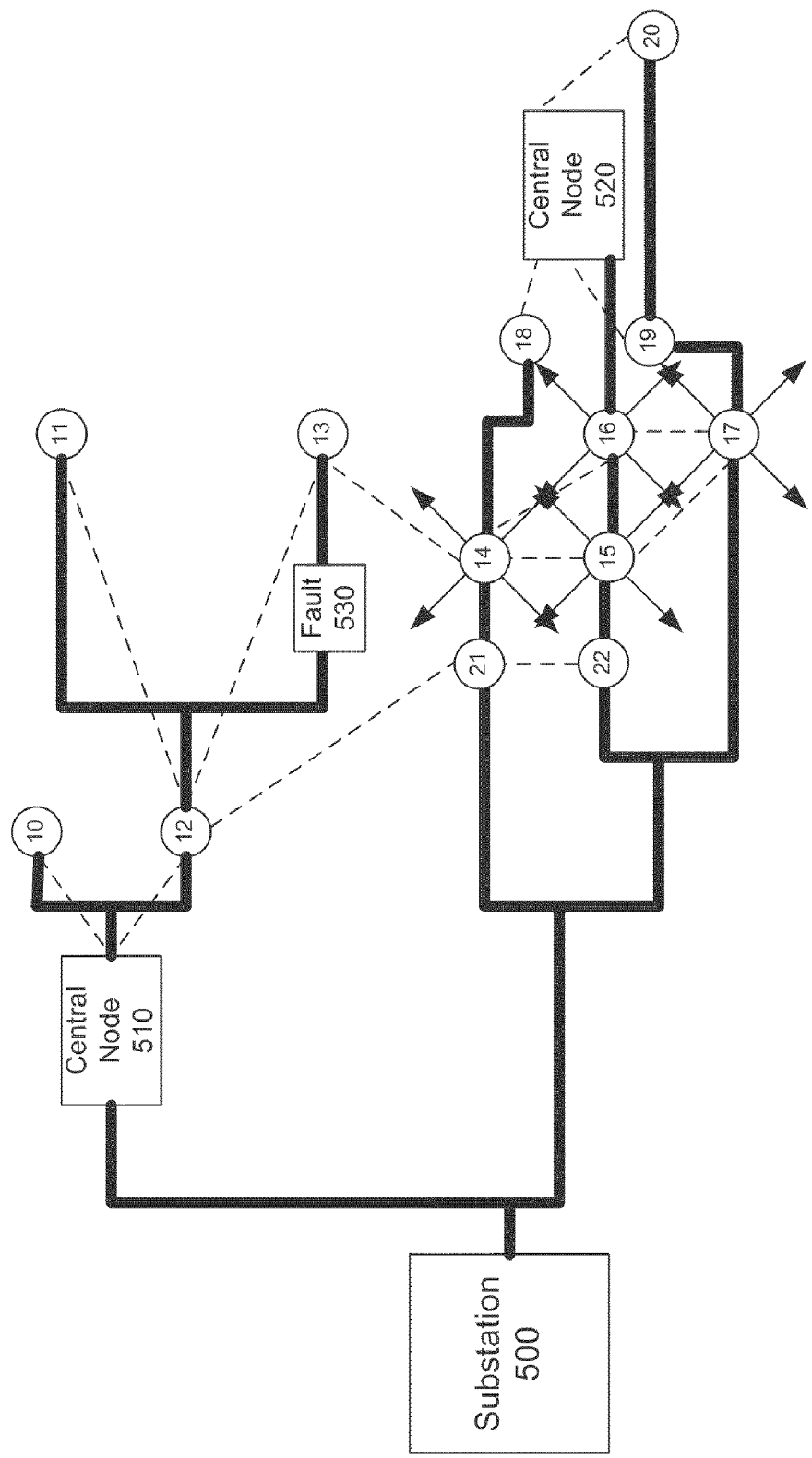
FIG. 6 is a diagram of an exemplary broadcast stranding notification.

Any non-stranded node that hears the broadcast stranding notification may forward this message back up its communication path to its central node. A node that has forwarded a broadcast stranding notification with a particular sequence number may have the capability to recognize that this message has previously been processed and will, therefore, not forward the same broadcast stranding notification (with the same sequence number) if received again. The broadcast stranding notification provides path diversity to notify the head-end system of the stranded condition. An exemplary broadcast stranding notification is depicted in FIG. 6. As shown, stranded nodes 14-17 transmit the broadcast stranding notification (as indicated by the diagonal arrows emitting from each of nodes 14-17). The broadcast stranding notifications transmitted by nodes 16 and 17 will be received by nodes 18 and 19, respectively, and then forwarded by nodes 18 and 19 along their assigned communication paths to central node 520.

The techniques above describe a stranded node's ability to push a stranding notification to other nodes and, eventually, to a central node and/or head-end. However, in addition to a stranded node's capability to push a stranding notification, information about stranding may also be pulled from a stranded node via a stranding request. This stranding information may be useful to determine the extent of a power outage or the progress of a power restoration process. In particular, the stranding information may be requested by a head-end through the central nodes using a broadcast stranding request. The head-end may use geographic coordinates or other information to identify a list of central nodes that are in close proximity to a suspected or known power outage or power restoration process. Each identified central node may, in turn, be instructed to transmit the broadcast stranding request. Upon receiving the broadcast stranding request, each of the bi-directional nodes may either, if stranded, respond to the request, or, if not stranded, re-broadcast the request to other bi-directional nodes. The broadcast stranding request may include a unique sequence number. Any stranded node in a central node's communication network or on the fringes of a central node's communication network that receives the broadcast stranding request may respond back along the path through which the broadcast stranding message was communicated. A stranded node will preferably not respond more than once to the same broadcast stranding request. The response to the broadcast stranding request may include an identification of the stranded node, the unique broadcast stranding request sequence number, and the stranded reason.

Figure 7:
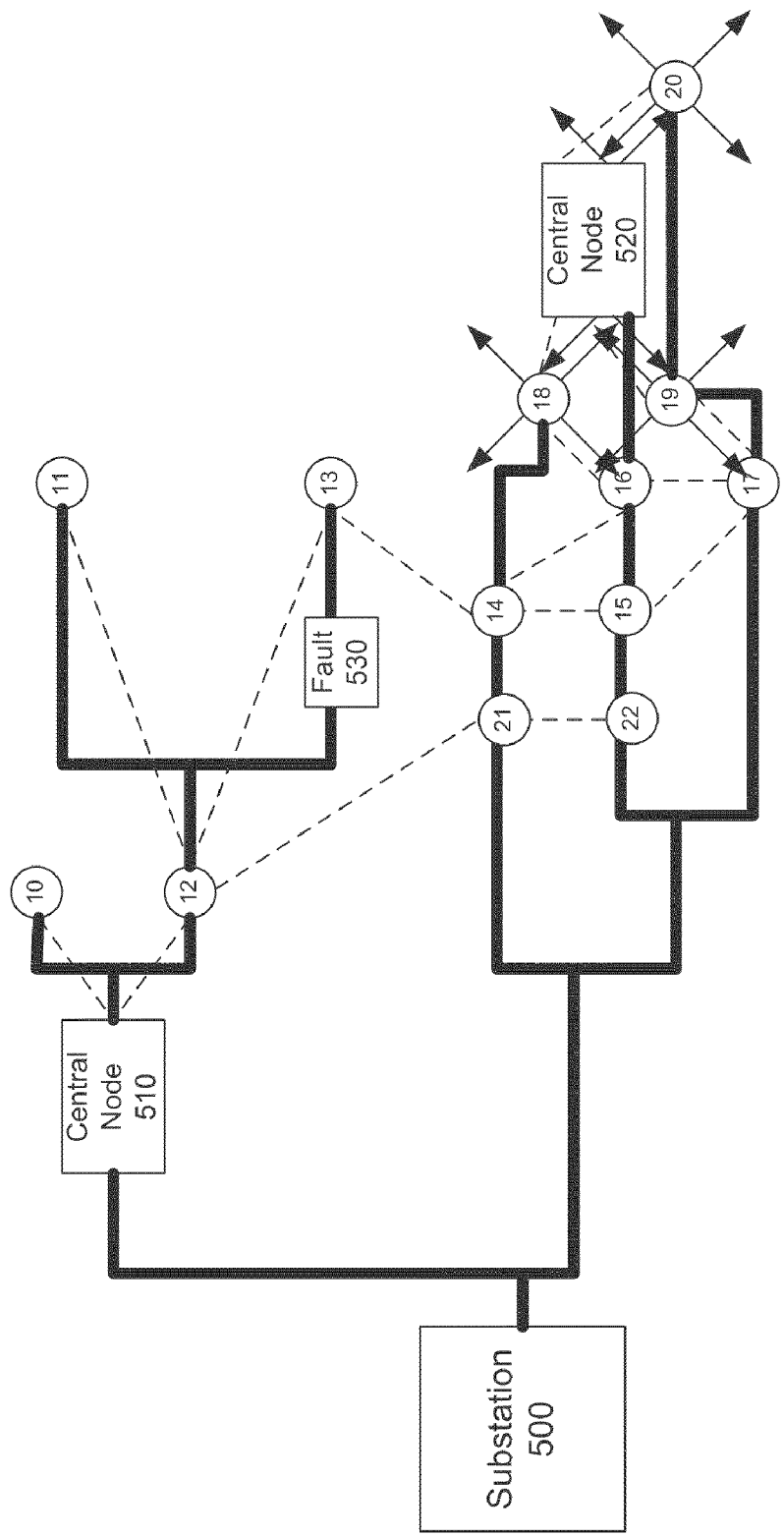
FIG. 7 is a diagram of an exemplary broadcast stranding request.

An exemplary broadcast stranding request is depicted in FIG. 7. As shown, central node 520 initiates the broadcast stranding request, which is then relayed by nodes 18-20 (as indicated by the diagonal arrows emitting from each of central node 520 and nodes 18-20). The broadcast stranding request transmitted by nodes 18 and 19 will be received by nodes 16 and 17, respectively, which will then respond to the request. The response will be transmitted from nodes 16 and 17 to nodes 18 and 19, respectively, which will then forward the response along their assigned communication paths back to central node 520. In FIG. 7, nodes 16 and 17 are assigned to a different central node (e.g., central node 510) than are nodes 18 and 19 (e.g., central node 520). It should, therefore, be appreciated that the broadcast stranding request may be broadcast and re-broadcast between bi-directional nodes that are assigned to the same or different central nodes.

Figure 8:
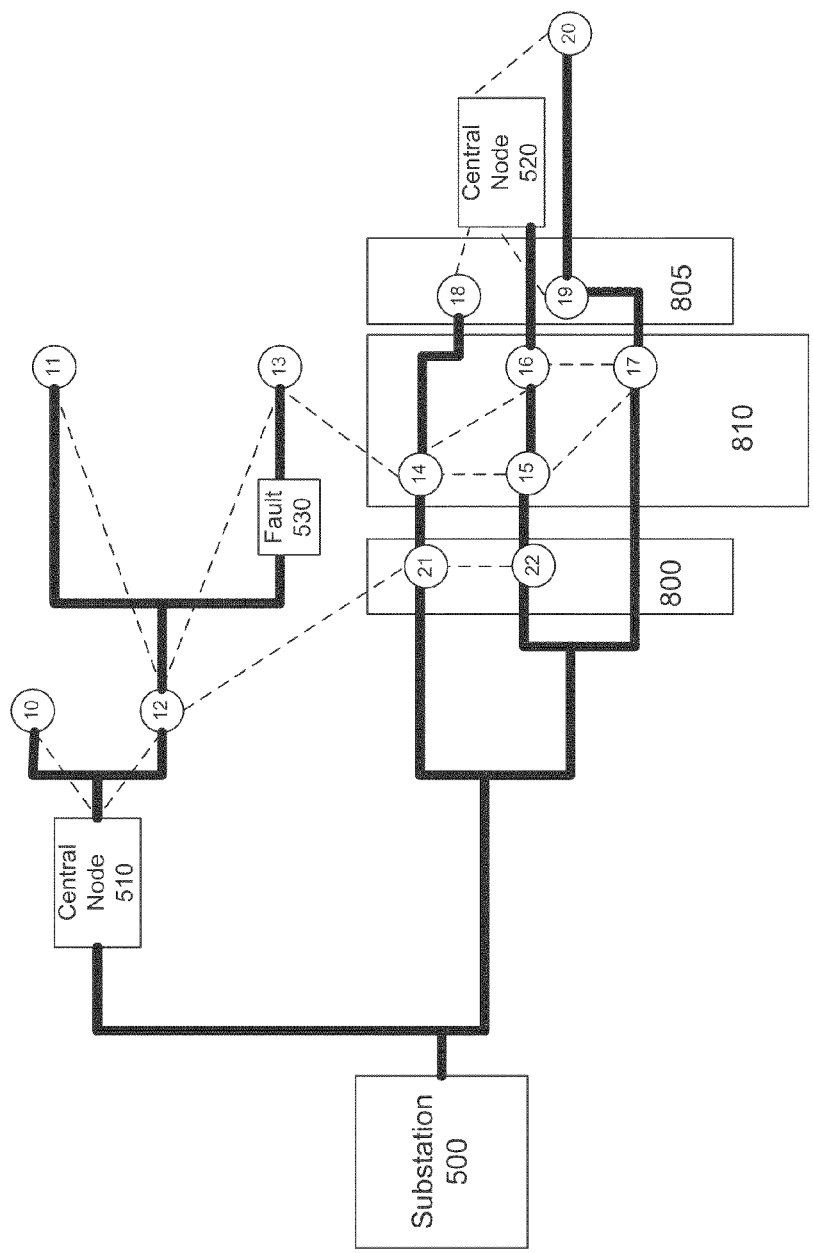
FIG. 8 is a diagram of an exemplary targeted stranding request.

In addition to the broadcast stranding request, another tool for helping to find stranded nodes within a mesh network and to help quantify the extent of an power outage or power restoration process is the targeted stranding request. Based upon either geographic coordinates or other information, the head-end system may identify a list of targeted nodes to be pinged (a "ping list") and a list of nodes to ping from (a "ping from" list). The nodes to be pinged may be nodes that are suspected of being stranded. The ping list may include nodes that are suspected of being stranded based on, for example, a known or suspected power outage, power restoration process, or other problem or activity in their vicinity. An exemplary targeted stranding request is depicted in FIG. 8. In FIG. 8, the nodes included in the ping list are shown in box 810, while the nodes included in the ping from list are shown in boxes 800 and 805.

The head-end system may identify the central nodes that are required based upon the "ping from" list of nodes. For example, in FIG. 8, central node 510 will be required because one or more of its assigned nodes (e.g., the nodes in box 800) are included in the ping from list. Central node 520 will also be required because one or more of its assigned nodes (e.g., the nodes in box 805) are included in the ping from list. Thus, as shown in FIG. 8, one or more of the ping-from nodes may be assigned to a different central node than are the ping-to nodes. After identifying each required central node, the head-end system may send to each central node a "ping from" path and the "ping list" of devices. The ping results may be provided by each central node back to head-end system. The successfully pinged devices will indicate devices that are powered and help determine the extent of an outage or the progress of the restoration process.

As set forth above, bi-directional nodes may transmit a power outage (e.g., "last gasp") notification just prior to losing power. In order to optimize path diversity of the last gasp message, the manner in which the last gasp message is transmitted may vary depending upon a last gasping node's position within its communication path to the collector. If a last gasping node is not the last node in a communication path to a central node (such as, for example, node 13), then the last gasping node may transmit its last gasp message back to its assigned central node along its assigned communication path (e.g., form node 13 to node 12 to central node 510). On the other hand, if a last gasping node is the last node in a communication path to a central node (such as, for example, node 17), then the last gasping node may broadcast its last gasp message. Any other bi-directional node(s) that hear the last gasp message may then broadcast a "surrogate" last gasp message on behalf of the last gasping node in an attempt to forward the last gasp message ahead to at least one central node (whether it be the last gasping node's assigned central node or a different central node).

Figure 9:
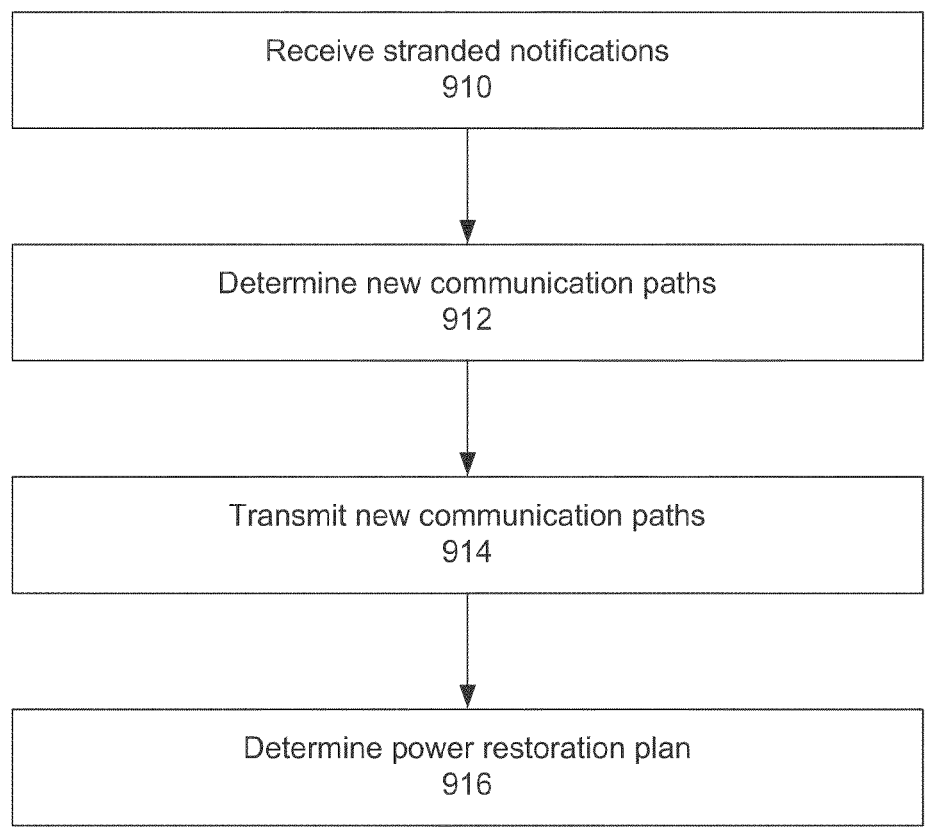
FIG. 9 is a flowchart of an exemplary method for responding to a stranding notification.

An exemplary method for managing stranded nodes is depicted in FIG. 9. At act 910, one or more stranding notifications (indicating that one or more bi-directional nodes are stranded) are received by one or more management servers or the head-end. The stranding notifications received at act 910 may be broadcast stranding notifications as shown, for example, in FIG. 6. The stranding notifications received at act 910 may also be replies to a broadcast stranding request as shown, for example, in FIG. 7. The stranding notifications received at act 910 may also be replies to a targeted stranding request as shown, for example, in FIG. 8. The stranding notifications received at act 910 may also be any combination of the notifications described above or possibly another type of stranding notification.

At act 912, the management servers or head-end attempts to establish a new communication path for each stranded node from which a stranding notification was received. The new communication path is a direct or indirect (e.g., via relay nodes) path to an operable central node through zero or more operable relay nodes. Some exemplary techniques for establishing a communication path are set forth above with respect to FIGS. 3 and 4. Prior to establishing new communication paths, the management servers and/or head-ends may perform a number of tests to attempt to determine the full extent of a power outage or other network problem. Some of these tests may include the broadcast stranding request and/or the targeted stranding request described above. At act 914, new communications paths are transmitted to the central nodes via their new assigned communications paths.

For some stranded nodes, it may be impossible to establish a new communication path right away (e.g., if, at the current time, there are insufficient operable relay nodes and/or central nodes to form a communication path). The central nodes, management servers and/or head-ends may keep a running list of each node for which a communication path could not be established and may attempt to re-establish communication paths for these nodes within a configurable amount of time and/or after receiving new information that one or more formerly inoperable central nodes or relay nodes have become re-operable.

At act 916, a power restoration plan is developed. This plan may developed based on the stranding notifications received at act 910 and/or other information received that can be used to determine the extent of a power outage or other network problem. The power restoration plan may be developed based on any combination of network factors such as, for example, relative importance of the locations, accessibility, and/or positions of inoperable nodes and/or fault locations and/or other factors. For example, it may be optimal to restore power to locations based on their relative position within an electrical distribution path, with power being restored first to upstream locations and then to downstream locations. Additionally, for example, it may be optimal to restore power to locations based on their relative position in their communication paths, with power being restored first to upstream locations and then to downstream locations. Additionally, for example, if there are a large number of fault locations or inoperable nodes in close proximity to one another, it may be optimal to restore power to those locations first and to then restore power to outlying locations. Additionally, for example, if a large number of customers are located in a certain area, then it may be optimal to restore power to that area first and then to other areas.

The acts described above with respect to FIG. 9 need not necessarily be performed in the order listed depicted in FIG. 9. For example, a power restoration plan may be developed at any time prior to or during the establishment of new communication paths. After power has been restored, either partially or completely, previously stranded nodes may be re-assigned to their previous communications paths (e.g., the communication paths to which they were assigned prior to the power outage), or may remain assigned to their new communications paths.

While systems and methods have been described and illustrated with reference to specific embodiments, those skilled in the art will recognize that modification and variations may be made without departing from the principles described above and set forth in the following claims. For example, although in the embodiments described above, the systems and methods of the present invention are described in the context of a network of metering devices, such as electricity, gas, or water meters, it is understood that the present invention can be implemented in any kind of network. Accordingly, reference should be made to the following claims as describing the scope of the present invention.

What is claimed:

1. A wireless network comprising:
one or more central nodes; and
a plurality of bi-directional nodes in bi-directional wireless communication with the one or more central nodes, each of the bi-directional nodes having a wireless communication path to one of the central nodes that is either a direct path or an indirect path through one or more intermediate bi-directional nodes serving as relays,
wherein each bi-directional node is configured to detect when it has become stranded such that it can no longer communicate with its assigned central node via its assigned communication path due to a presumed power outage at an upstream node in the communication path, to determine a reason for its stranding, and to transmit a stranding notification and the reason therefore,
wherein each central node is configurable to broadcast a stranding request that any stranded node respond to the request, and each of the bi-directional nodes is configured to either respond to the request with the stranding notification and the reason therefore or to re-broadcast the request if not stranded.

2. The wireless network of claim 1, wherein the request is broadcast or re-broadcast between bi-directional nodes assigned to different central nodes.

3. The wireless network of claim 1, wherein each central node is configurable to transmit a targeted ping request to a suspected stranded bi-directional node.

4. The wireless network of claim 3, wherein the suspected stranded bi-directional node is assigned to a different central node than the central node that transmits the targeted ping request.

5. The wireless network of claim 1, wherein each bi-directional node is configured to broadcast the stranding notification.

6. The wireless network of claim 1, wherein the reason for stranding is receiving a power outage notification from an upstream node in the assigned communication path.

7. The wireless network of claim 1, wherein the reason for stranding is lack of communication received for greater than a threshold time period after a power restoration process.

8. The wireless network of claim 1, wherein the reason for stranding is lack of communication received from a central node for greater than a threshold time period.

9. The wireless network of claim 1, wherein each bi-directional node is configured to receive a power outage notification from another node and to broadcast a surrogate power outage notification on behalf of the other node.

10. The wireless network of claim 1, wherein each bi-directional node is configured to broadcast a power outage notification message if the bi-directional node is the end node on its communication path to its central node, and to transmit the power outage notification message along its communication path to its central node if the bi-directional node is not the end node on its communication path to its central node.

11. In a wireless network comprising one or more central nodes and a plurality of bi-directional nodes in bi-directional wireless communication with the one or more central nodes, each of the bi-directional nodes having a wireless communication path to one of the central nodes that is either a direct path or an indirect path through one or more intermediate bi-directional nodes serving as relays, a method for re-establishing communications with a stranded bi-directional node comprising:
broadcasting a stranding request that any stranded node respond to the request, each of the bi-directional nodes being configured to either respond to the request with a stranding notification and the reason therefore or to re-broadcast the request if not stranded;
receiving the stranded notification that the stranded bi-directional node has become stranded such that the stranded bi-directional node cannot communicate with its central node via its communication path due to a presumed power outage at an upstream node in the communication path;
responsively determining a new communication path for the stranded node to its previous central node or to a different central node; and
transmitting an identification of the new communication path to the stranded bi-directional node via the new communication path.

12. The method of claim 11, wherein the reason for stranding is receiving a power outage notification from an upstream node in the assigned communication path.

13. The method of claim 11, wherein the reason for stranding is lack of communication received for greater than a threshold time period after a power restoration process.

14. The method of claim 11, wherein the reason for stranding is lack of communication received from a central node for greater than a threshold time period.

15. In a wireless automated meter reading network comprising one or more collectors and a plurality of meters in bi-directional wireless communication with the one or more collectors, each of the meters having a wireless communication path to one of the collectors that is either a direct path or an indirect path through one or more intermediate meters serving as relays, a method for optimizing a plan for restoring power during a power outage comprising:
broadcasting a stranding request that any stranded meter respond to the request, each of the bi-directional meter s being configured to either respond to the request with a stranding notification and the reason therefore or to re-broadcast the request if not stranded;
receiving notifications that one or more meters have become stranded such that the stranded meters cannot communicate with their central nodes via their normal communication paths due to a presumed power outage at an upstream node in the communication path;
determining new communication paths between the stranded meters and their previous central nodes or different central nodes; and
determining a plan for restoration of power based on the notifications received from the stranded meters.

16. The method of claim 15, wherein the reason for stranding is receiving a power outage notification from an upstream node in the assigned communication path.

17. The method of claim 15, wherein the reason for stranding is lack of communication received for greater than a threshold time period after a power restoration process.

18. The method of claim 15, wherein the reason for stranding is lack of communication received from a central node for greater than a threshold time period.

* * * * *